United States Patent
Kim et al.

(10) Patent No.: US 10,223,614 B1
(45) Date of Patent: Mar. 5, 2019

(54) LEARNING METHOD, LEARNING DEVICE FOR DETECTING LANE THROUGH CLASSIFICATION OF LANE CANDIDATE PIXELS AND TESTING METHOD, TESTING DEVICE USING THE SAME

(71) Applicant: Stradvision, Inc., Pohang, Gyeongbuk (KR)

(72) Inventors: Kye-Hyeon Kim, Seoul (KR); Yongjoong Kim, Pohang-si (KR); Insu Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Donghun Yeo, Pohang-si (KR); Wooju Ryu, Pohang-si (KR); Taewoong Jang, Seoul (KR); Kyungjoong Jeong, Pohang-si (KR); Hongmo Je, Pohang-si (KR); Hojin Cho, Pohang-si (KR)

(73) Assignee: Stradvision, Inc., Pohang (KR)

( * ) Notice: Subject to any disclaimer, the term of this patent is extended or adjusted under 35 U.S.C. 154(b) by 0 days.

(21) Appl. No.: 16/121,084

(22) Filed: Sep. 4, 2018

(51) Int. Cl.
*G06K 9/62* (2006.01)
*G06K 9/00* (2006.01)

(52) U.S. Cl.
CPC ....... *G06K 9/6262* (2013.01); *G06K 9/00798* (2013.01); *G06K 9/6256* (2013.01); *G06K 9/6277* (2013.01)

(58) Field of Classification Search
CPC ............. G06K 9/00798; G06K 9/6256; G06K 9/6262; G06K 9/6277
USPC .......................................................... 382/157
See application file for complete search history.

(56) References Cited

U.S. PATENT DOCUMENTS

2018/0181817 A1* 6/2018 Yan ........................... G06N 3/02
2018/0285659 A1* 10/2018 Kwant ............... G06K 9/00798

OTHER PUBLICATIONS

Gurghian, et al, DeepLanes: End-To-End Lane Position Estimation using Deep Neural Networks, IEEE, pp. 38-45. (Year: 2016).*

* cited by examiner

*Primary Examiner* — Daniel G Mariam
(74) *Attorney, Agent, or Firm* — Xsensus LLP (57) ABSTRACT

A learning method for detecting at least one lane based on a convolutional neural network (CNN) is provided. The learning method includes steps of: (a) a learning device obtaining encoded feature maps, and information on lane candidate pixels in a input image; (b) the learning device, classifying a first parts of the lane candidate pixels, whose probability scores are not smaller than a predetermined threshold, as strong line pixels, and classifying the second parts of the lane candidate pixels, whose probability scores are less than the threshold but not less than another predetermined threshold, as weak lines pixels; and (c) the learning device, if distances between the weak line pixels and the strong line pixels are less than a predetermined distance, classifying the weak line pixels as pixels of additional strong lines, and determining that the pixels of the strong line and the additional correspond to pixels of the lane.

18 Claims, 5 Drawing Sheets

LEARNING METHOD, LEARNING DEVICE FOR DETECTING LANE THROUGH CLASSIFICATION OF LANE CANDIDATE PIXELS AND TESTING METHOD, TESTING DEVICE USING THE SAME

FIELD OF THE INVENTION

The present invention relates to a learning method and a learning device for detecting one or more lanes based on a convolutional neural network (CNN), and a testing method and a testing device using the same; and more particularly, to the learning method for detecting at least one lane based on the convolutional neural network (CNN), including steps of: (a) the learning device, if an input image is obtained, supporting an encoding layer to apply one or more convolution operations to the input image to thereby obtain one or more encoded feature maps, and supporting a decoding layer to apply one or more deconvolution operations to a specific encoded feature map outputted from the encoding layer to thereby obtain a segmentation result including information on one or more lane candidate pixels in the input image; (b) the learning device comparing each of probability scores of each of the lane candidate pixels with a predetermined first threshold and comparing each of the probability scores with a predetermined second threshold smaller than the first threshold, then if one or more probability scores of one or more first parts of the lane candidate pixels are equal to or greater than the first threshold, classifying the first parts of the lane candidate pixels as pixels of one or more first strong lines, and if one or more probability scores of one or more second parts of the lane candidate pixels are less than the first threshold and are equal to or greater than the second threshold, classifying the second parts as pixels of one or more weak lines; and (c) the learning device, if one or more values of distance between (i) one or more specific pixels among the pixels of the weak lines and (ii) at least part of the pixels of the first strong lines are less than a predetermined first distance, classifying the specific pixels as pixels of one or more additional strong lines, and determining that the pixels of the first strong lines and the pixels of the additional strong lines correspond to pixels of the lane; and the learning device, the testing method and the testing device using the same.

BACKGROUND OF THE INVENTION

Deep learning is a technology used to cluster or classify objects or data. For example, computers cannot distinguish dogs and cats from photographs alone. But a human can easily distinguish those two. To this end, a method called "machine learning" was devised. It is a technique to allow a computer to classify similar things among lots of data inputted into the computer. When a photo of an animal similar to a dog is inputted, the computer will classify it as a dog photo.

There have already been many machine learning algorithms to classify data. For example, a decision tree, a Bayesian network, a support vector machine (SVM), an artificial neural network, etc. have been developed. The deep learning is a descendant of the artificial neural network.

Deep Convolution Neural Networks (Deep CNNs) are the heart of the remarkable development in deep learning. CNNs have already been used in the 90's to solve the problem of character recognition, but their use has become as widespread as it is now thanks to recent research. These deep CNNs, won the 2012 ImageNet image classification tournament, crushing other competitors. Then, the convolution neural network became a very useful tool in the field of the machine learning.

Figure 1:
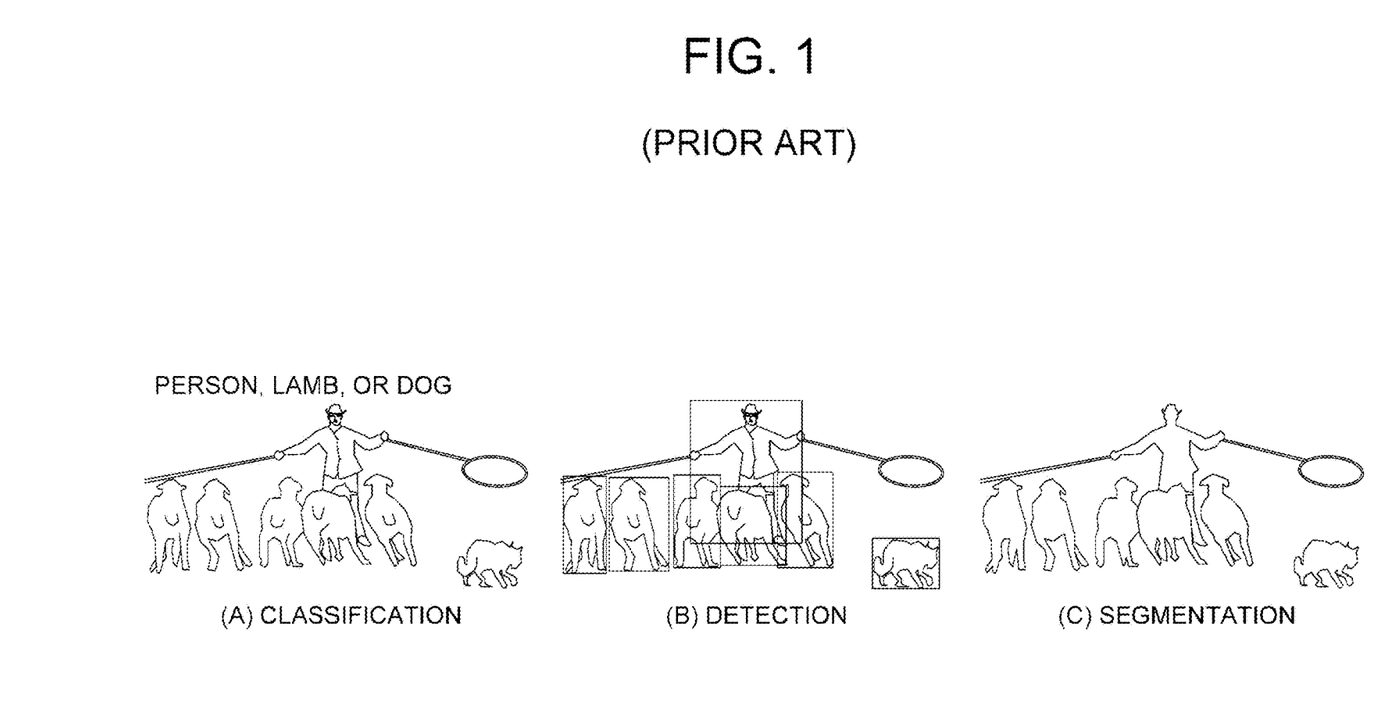
FIG. 1 is a drawing schematically illustrating an example of various outputs acquired from a photograph using a conventional CNN.

FIG. 1 shows an example of various outputs to be acquired from a photograph using a deep CNN according to prior art.

Classification is a method for identifying a type of a class to be acquired from a photograph, for example, as shown in FIG. 1, determining whether an acquired object is a person, a lamb, or a dog. Detection is a method for finding every object and displaying the found object as enclosed in a bounding box. Segmentation is a method for distinguishing a region of a specific object from other objects in a photograph. As the deep learning has recently become popular, the classification, the detection, and the segmentation are using the deep learning heavily.

Figure 2:
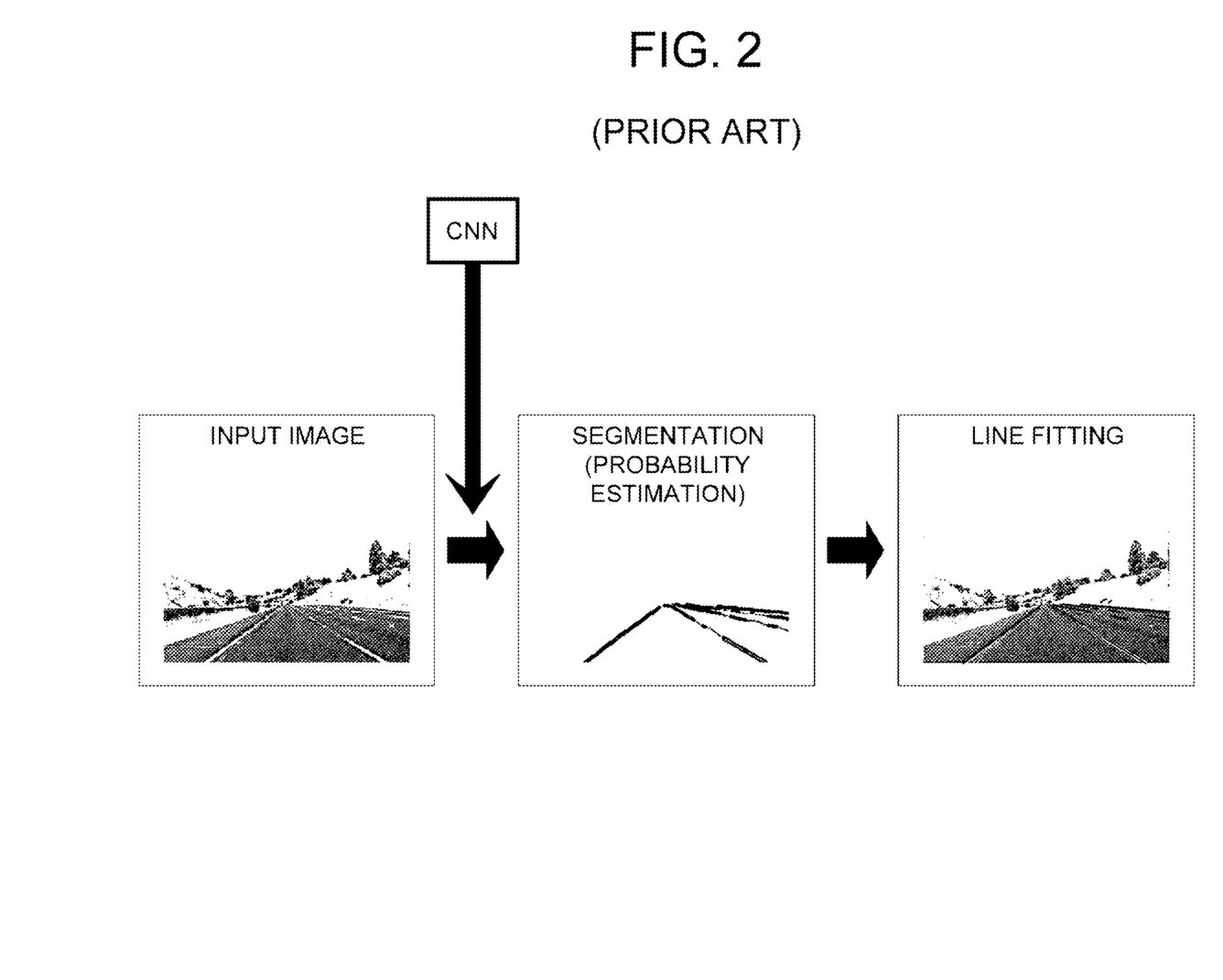
FIG. 2 is a drawing schematically illustrating a conventional lane detection method using the conventional CNN.
Figure 3:
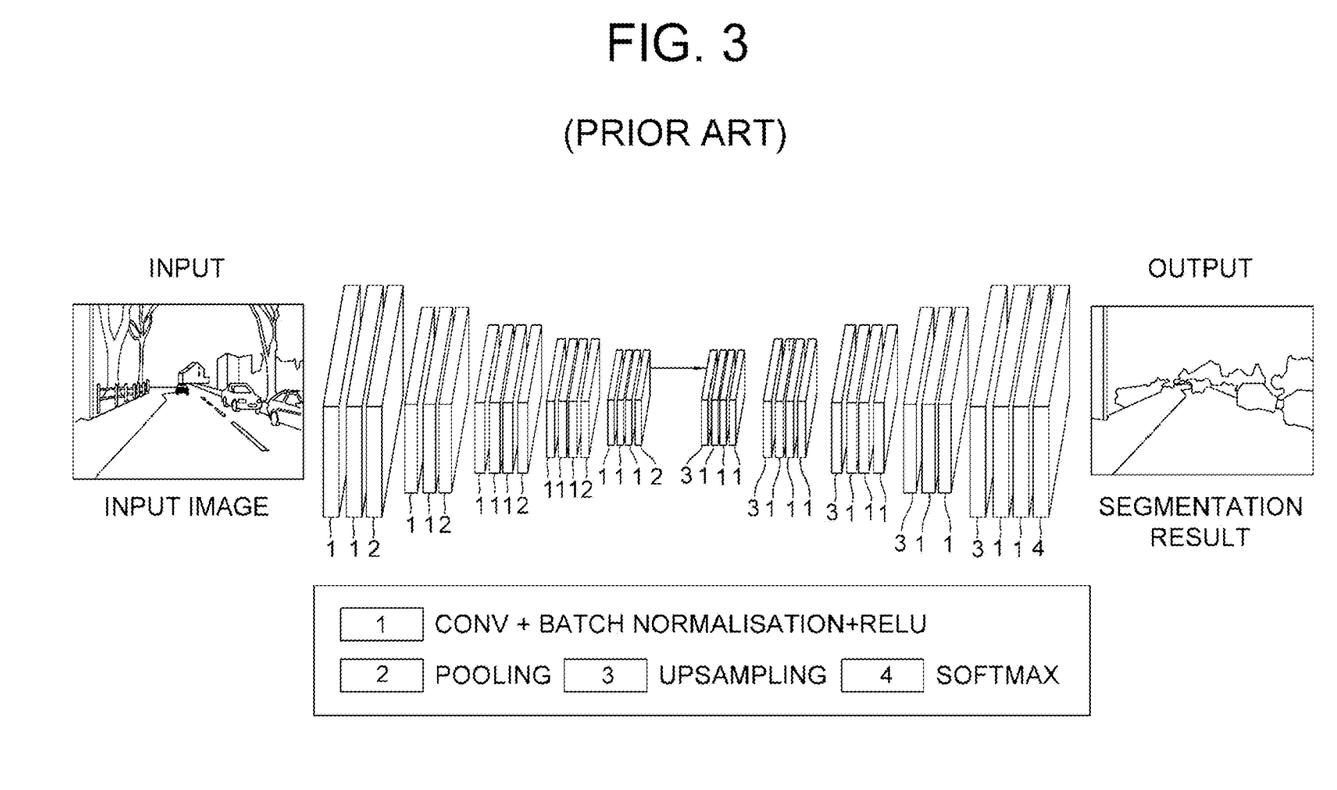
FIG. 3 is a drawing schematically illustrating a conventional process of a general segmentation by using the conventional CNN.

FIG. 2 is a simplified drawing of a conventional lane detection method using a CNN, and FIG. 3 is a simplified drawing of a general CNN segmentation process.

First of all, by referring to FIG. 3, according to the conventional lane detection method, a learning device receives an input image, acquires feature maps by multiple convolution operations and non-linear operations like ReLU in multiple convolutional layers, and acquires a segmentation result by performing multiple deconvolution operations in multiple deconvolutional layers and SoftMax operations on a last of the feature maps.

Also, by referring to FIG. 2, the segmentation result of the conventional lane detection method is composed of two elements, i.e., lanes and backgrounds, as shown in the middle of FIG. 2. The segmentation result is expressed as probability estimation. The lanes are found by sampling pixels with high probabilities of being on any lane from candidate pixels on the lane selected as such, and then the lanes are finally determined by using a lane modeling function acquired from pixels on the found lanes.

On the other hand, according to the method for detecting at least one lane based on the CNN from the input image as illustrated in FIG. 2, certain candidate pixels, determined as having low probabilities of being one of the lanes, are not used during a process of the lane detection. For example, a part formed of dotted lines may be the certain candidate pixels determined as having low probabilities of being one of the lanes, and thin lanes or lanes at a distant side in the input image may also be the certain candidate pixels determined as having low probabilities of being one of the lanes. Likewise, since the above-mentioned certain candidate pixels determined as having low probabilities of being one of the lanes are not recognized as any lane, many disconnected lines are generated and it is difficult to obtain long lines.

SUMMARY OF THE INVENTION

It is an object of the present invention to solve all the aforementioned problems.

It is another object of the present invention to provide a method for detecting a lane, located at a long distance according to the law of perspective, in an image.

It is still another object of the present invention to detect actual lanes precisely even if some pixels of the actual lanes are determined as having low probabilities of being one of lanes.

In accordance with another aspect of the present invention, there is provided a learning method for detecting at least one lane based on a convolutional neural network (CNN), including steps of: (a) a learning device, if an input image is obtained, supporting an encoding layer to apply one or more convolution operations to the input image to thereby obtain one or more encoded feature maps, and supporting a decoding layer to apply one or more deconvolution operations to a specific encoded feature map outputted from the encoding layer to thereby obtain a segmentation result including information on one or more lane candidate pixels in the input image; (b) the learning device comparing each of probability scores of each of the lane candidate pixels with a predetermined first threshold and comparing each of the probability scores with a predetermined second threshold smaller than the first threshold, then if one or more probability scores of one or more first parts of the lane candidate pixels are equal to or greater than the first threshold, classifying the first parts of the lane candidate pixels as pixels of one or more first strong lines, and if one or more probability scores of one or more second parts of the lane candidate pixels are less than the first threshold and are equal to or greater than the second threshold, classifying the second parts as pixels of one or more weak lines; and (c) the learning device, if one or more values of distance between (i) one or more specific pixels among the pixels of the weak lines and (ii) at least part of the pixels of the first strong lines are less than a predetermined first distance, classifying the specific pixels as pixels of one or more additional strong lines, and determining that the pixels of the first strong lines and the pixels of the additional strong lines correspond to pixels of the lane.

As one example, after the step of (c), the learning device, if one or more values of distance between (i) one or more certain pixels among the pixels of the weak lines and (ii) at least part of the pixels of the additional strong lines are less than a predetermined second distance, performs a process of classifying the certain pixels as pixels of the additional strong lines, and repeats the process until there is no certain pixel to be further classified as a pixel of the additional strong lines, then determines that the pixels of the first strong lines and the pixels of the additional strong lines correspond to the pixels of the lane.

As one example, at the step of (c), (c1) if the values of distance between (i) the specific pixels among the pixels of the weak lines and (ii) at least part of the pixels of the first strong lines are less than the predetermined first distance, the learning device classifies the specific pixels as the pixels of the additional strong lines; (c2) if the values of distance between (i) the certain pixels among the pixels of the weak lines and (ii) at least part of the pixels of the additional strong lines are less than the predetermined second distance, the learning device classifies the certain pixels as the pixels of the additional strong lines; and (c3) the learning device repeats the step of (c2) until there is no certain pixel to be further classified as a pixel of the additional strong lines, then determines the pixels of the first strong lines and those of the additional strong lines as the pixels of the lane.

As one example, at the step of (c), the learning device determines whether each of the pixels of the weak lines is classified as one of the pixels of the additional strong lines by referring to information on a direction of lane corresponding to the pixels of the first strong lines, wherein, if the pixels of the first strong lines are grouped in a direction of a specific angle within the input image, (I) the learning device determines whether there are a first part of the pixels of the weak lines within a first pixel distance from at least part of the pixels of the first strong lines in case the first part of the pixels of the weak lines are within a predetermined angle from the direction, and (II) the learning device determines whether there are a second part of the pixels of the weak lines within a second pixel distance from at least part of the pixels of the first strong lines in case the second part of the pixels of the weak lines are not within the predetermined angle from the direction, and wherein the second pixel distance is smaller than the first pixel distance.

As one example, at the step of (c), the learning device detects the lane corresponding to the pixels of the first strong line and the additional strong line by using Polynomial fitting algorithm or spline fitting algorithm.

As one example, the predetermined first distance represents a distance between two closest pixels.

As one example, the predetermined first distance represents a distance between a certain pixel and an n-th pixel from the certain pixel.

As one example, the learning method further includes steps of: (d) the learning device calculating a segmentation loss by referring to the detected lane and a ground truth (GT) lane; and (e) the learning device performing backpropagation by using the segmentation loss to thereby optimize at least one parameter of the CNN.

In accordance with still another aspect of the present invention, there is provided a testing method for detecting at least one lane included in a convolutional neural network (CNN)-based image, including steps of: (a) on condition that (I) a learning device has supported an encoding layer to apply one or more convolution operations to a training image to thereby obtain one or more encoded feature maps for training, and has supported a decoding layer to apply one or more deconvolution operations to a specific encoded feature map for training outputted from the encoding layer to thereby obtain a segmentation result for training including information on one or more lane candidate pixels for training in the training image; (II) the learning device has compared each of probability scores of each of the lane candidate pixels for training with a predetermined first threshold and compares each of the probability scores with a predetermined second threshold smaller than the first threshold, then if one or more probability scores of one or more first parts of the lane candidate pixels for training are equal to or greater than the first threshold, has classified the first parts of the lane candidate pixels for training as pixels of one or more first strong lines for training, and if one or more probability scores of one or more second parts of the lane candidate pixels for training are less than the first threshold and are equal to or greater than the second threshold, has classified the second parts as pixels of one or more weak lines for training; (III) the learning device, if one or more values of distance between (i) one or more specific pixels among the pixels of the weak lines for training and (ii) at least part of the pixels of the first strong lines for training are less than a predetermined first distance, has classified the specific pixels as pixels of one or more additional strong lines for training, and has determined that the pixels of the first strong lines for training and the specific pixels of the additional strong lines for training correspond to pixels of the lane; (IV) the learning device has calculated a segmentation loss by referring to the detected lane and a ground truth (GT) lane; and (V) the learning device has performed backpropagation by using the segmentation loss to thereby optimize at least one parameter of the learning device, a testing device obtaining a test image; (b) the testing device supporting the encoding layer to apply one or more convolution operations to the test image to thereby obtain one or more encoded feature maps for testing, and supporting the decoding layer to apply one or more deconvolution operations to a specific encoded feature map for testing outputted from the encoding layer to thereby obtain a segmentation result for testing including information on one or more lane candidate pixels for testing in the test image; (c) the testing device comparing each of probability scores of each of the lane candidate pixels for testing with a predetermined first threshold and comparing each of the probability scores with a predetermined second threshold smaller than the first threshold, then if one or more probability scores of one or more first parts of the lane candidate pixels for testing are equal to or greater than the first threshold, classifying the first parts of the lane candidate pixels for testing as pixels of one or more first strong lines for testing, and if one or more probability scores of one or more second parts of the lane candidate pixels for testing are less than the first threshold and are equal to or greater than the second threshold, classifying the second parts as pixels of one or more weak lines for testing; and (d) the testing device, if one or more values of distance between (i) one or more specific pixels among the pixels of the weak lines for testing and (ii) at least part of the pixels of the first strong lines for testing are less than the predetermined first distance, classifying the specific pixels as pixels of one or more additional strong lines for testing, and determining that the pixels of the first strong lines for testing and the pixels of the additional strong lines for testing correspond to pixels of the lane.

In accordance with still yet another aspect of the present invention, there is provided a learning device for detecting at least one lane based on a convolutional neural network (CNN), including: a communication part for obtaining an input image; and a processor for performing processes of (I), if the input image is obtained, supporting an encoding layer to apply one or more convolution operations to the input image to thereby obtain one or more encoded feature maps, and supporting a decoding layer to apply one or more deconvolution operations to a specific encoded feature map outputted from the encoding layer to thereby obtain a segmentation result including information on one or more lane candidate pixels in the input image, (II) comparing each of probability scores of each of the lane candidate pixels with a predetermined first threshold and comparing each of the probability scores with a predetermined second threshold smaller than the first threshold, then if one or more probability scores of one or more first parts of the lane candidate pixels are equal to or greater than the first threshold, classifying the first parts of the lane candidate pixels as pixels of one or more first strong lines, and if one or more probability scores of one or more second parts of the lane candidate pixels are less than the first threshold and are equal to or greater than the second threshold, classifying the second parts as pixels of one or more weak lines, and (III) if one or more values of distance between (i) one or more specific pixels among the pixels of the weak lines and (ii) at least part of the pixels of the first strong lines are less than a predetermined first distance, classifying the specific pixels as pixels of one or more additional strong lines, and determining that the pixels of the first strong lines and the pixels of the additional strong lines correspond to pixels of the lane.

As one example, after the process of (III), the processor, if one or more values of distance between (i) one or more certain pixels among the pixels of the weak lines and (ii) at least part of the pixels of the additional strong lines are less than a predetermined second distance, performs a process of classifying the certain pixels as pixels of the additional strong lines, and repeats the process until there is no certain pixel to be further classified as a pixel of the additional strong lines, then determines that the pixels of the first strong lines and the pixels of the additional strong lines correspond to the pixels of the lane.

As one example, at the process of (III), (III_1) if the values of distance between (i) the specific pixels among the pixels of the weak lines and (ii) at least part of the pixels of the first strong lines are less than the predetermined first distance, the processor classifies the specific pixels as the pixels of the additional strong lines; (III_2) if the values of distance between (i) the certain pixels among the pixels of the weak lines and (ii) at least part of the pixels of the additional strong lines are less than the predetermined second distance, the processor classifies the certain pixels as the pixels of the additional strong lines; and (III_3) the processor repeats the process of (III_2) until there is no certain pixel to be further classified as a pixel of the additional strong lines, then determines the pixels of the first strong lines and those of the additional strong lines as the pixels of the lane.

As one example, at the process of (III), the processor determines whether each of the pixels of the weak lines is classified as one of the pixels of the additional strong lines by referring to information on a direction of lane corresponding to the pixels of the first strong lines, wherein, if the pixels of the first strong lines are grouped in a direction of a specific angle within the input image, (1) the processor determines whether there are a first part of the pixels of the weak lines within a first pixel distance from at least part of the pixels of the first strong lines in case the first part of the pixels of the weak lines are within a predetermined angle from the direction, and (2) the processor determines whether there are a second part of the pixels of the weak lines within a second pixel distance from at least part of the pixels of the first strong lines in case the second part of the pixels of the weak lines are not within the predetermined angle from the direction, and wherein the second pixel distance is smaller than the first pixel distance.

As one example, at the process of (III), the processor detects the lane corresponding to the pixels of the first strong line and the additional strong line by using Polynomial fitting algorithm or spline fitting algorithm.

As one example, the predetermined first distance represents a distance between two closest pixels.

As one example, the predetermined first distance represents a distance between a certain pixel and an n-th pixel from the certain pixel.

As one example, the processor further performs processes of: (IV) calculating a segmentation loss by referring to the detected lane and a ground truth (GT) lane; and (V) performing backpropagation by using the segmentation loss to thereby optimize at least one parameter of the CNN.

In accordance with still yet another aspect of the present invention, there is provided a testing device for detecting at least one lane included in a convolutional neural network (CNN)-based image, including: a communication part for, on condition that (I) a learning device has supported an encoding layer to apply one or more convolution operations to a training image to thereby obtain one or more encoded feature maps for training, and has supported a decoding layer to apply one or more deconvolution operations to a specific encoded feature map for training outputted from the encoding layer to thereby obtain a segmentation result for training including information on one or more lane candidate pixels for training in the training image; (II) the learning device has compared each of probability scores of each of the lane candidate pixels for training with a predetermined first threshold and compares each of the probability scores with a predetermined second threshold smaller than the first threshold, then if one or more probability scores of one or more first parts of the lane candidate pixels for training are equal to or greater than the first threshold, has classified the first parts of the lane candidate pixels for training as pixels of one or more first strong lines for training, and if one or more probability scores of one or more second parts of the lane candidate pixels for training are less than the first threshold and are equal to or greater than the second threshold, has classified the second parts as pixels of one or more weak lines for training; (III) the learning device, if one or more values of distance between (i) one or more specific pixels among the pixels of the weak lines for training and (ii) at least part of the pixels of the first strong lines for training are less than a predetermined first distance, has classified the specific pixels as pixels of one or more additional strong lines for training, and has determined that the pixels of the first strong lines for training and the specific pixels of the additional strong lines for training correspond to pixels of the lane; (IV) the learning device has calculated a segmentation loss by referring to the detected lane and a ground truth (GT) lane; and (V) the learning device has performed backpropagation by using the segmentation loss to thereby optimize at least one parameter of the learning device, obtaining a test image; and a processor for (1) supporting the encoding layer to apply one or more convolution operations to the test image to thereby obtain one or more encoded feature maps for testing, and supporting the decoding layer to apply one or more deconvolution operations to a specific encoded feature map for testing outputted from the encoding layer to thereby obtain a segmentation result for testing including information on one or more lane candidate pixels for testing in the test image, (2) comparing each of probability scores of each of the lane candidate pixels for testing with a predetermined first threshold and comparing each of the probability scores with a predetermined second threshold smaller than the first threshold, then if one or more probability scores of one or more first parts of the lane candidate pixels for testing are equal to or greater than the first threshold, classifying the first parts of the lane candidate pixels for testing as pixels of one or more first strong lines for testing, and if one or more probability scores of one or more second parts of the lane candidate pixels for testing are less than the first threshold and are equal to or greater than the second threshold, classifying the second parts as pixels of one or more weak lines for testing, and (3), if one or more values of distance between (i) one or more specific pixels among the pixels of the weak lines for testing and (ii) at least part of the pixels of the first strong lines for testing are less than the predetermined first distance, classifying the specific pixels as pixels of one or more additional strong lines for testing, and determining that the pixels of the first strong lines for testing and the pixels of the additional strong lines for testing correspond to pixels of the lane.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Detailed explanations of the present invention explained below refer to attached drawings that illustrate specific embodiment examples of this present that may be executed. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To make it easy for those who have common knowledge in the art to which the present invention pertains to implement the present invention, detailed explanation on desirable embodiment examples of the present invention will be made by referring to attached drawings.

Figure 4:
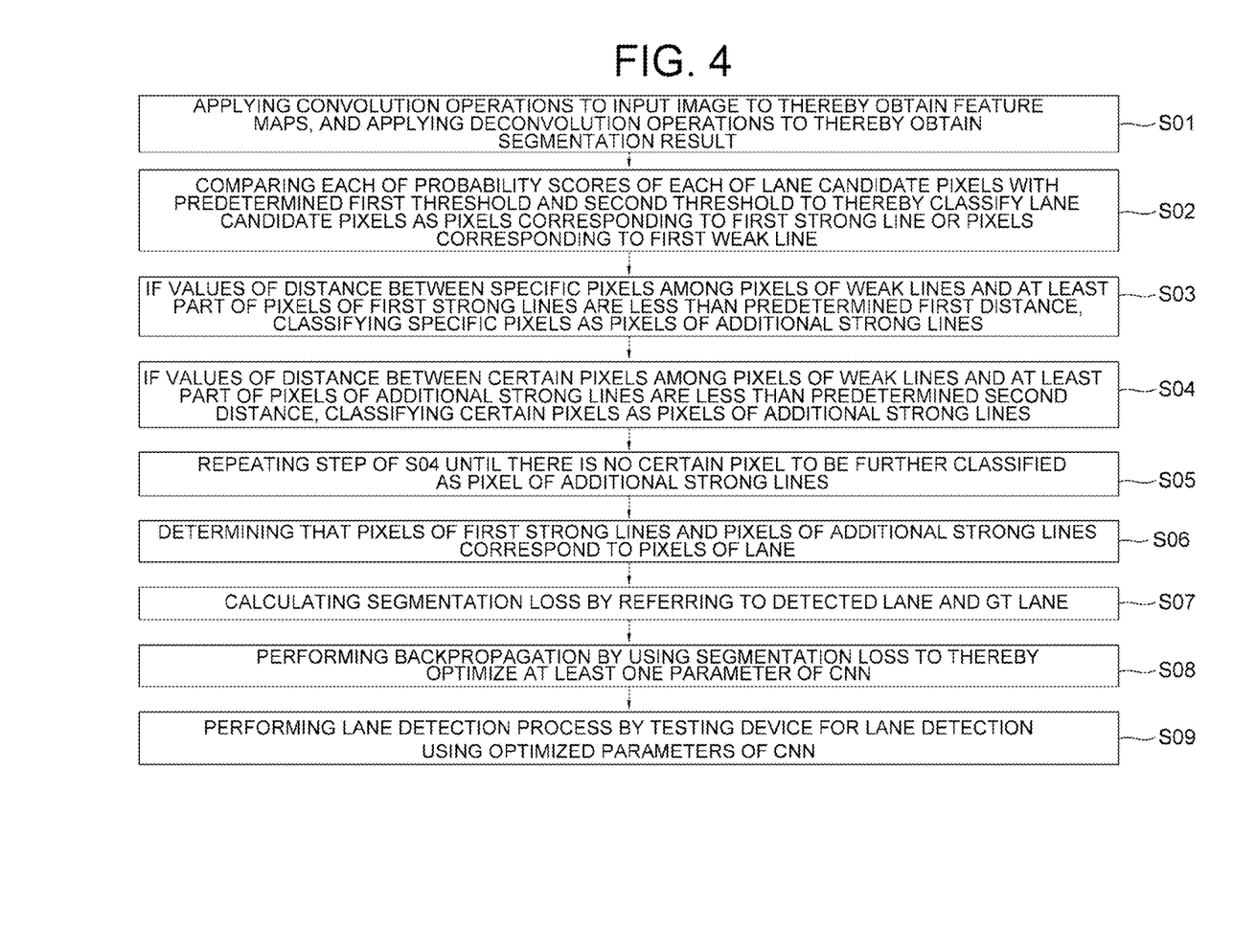
FIG. 4 is a flowchart illustrating a lane detection method based on a CNN in accordance with the present invention.

FIG. 4 is a flowchart illustrating a lane detection method based on a CNN in accordance with the present invention.

Referring to FIG. 4, a method for detecting at least one lane based on the convolutional neural network (CNN) includes: applying one or more convolution operations to an input image to thereby obtain one or more feature maps, and applying one or more deconvolution operations to thereby obtain a segmentation result at a step of S01; comparing each of probability scores of each of the lane candidate pixels with a predetermined first threshold and a second threshold to thereby classify the lane candidate pixels as pixels corresponding to a first strong line or pixels corresponding to a first weak line at a step of S02; if one or more values of distance between (i) one or more specific pixels among the pixels of the weak lines and (ii) at least part of the pixels of the first strong lines are less than a predetermined first distance, classifying the specific pixels as pixels of one or more additional strong lines at a step of S03; if one or more values of distance between (i) one or more certain pixels among the pixels of the weak lines and (ii) at least part of the pixels of the additional strong lines are less than a predetermined second distance, classifying the certain pixels as pixels of the additional strong lines at a step of S04; repeating the step of S04 until there is no certain pixel to be further classified as a pixel of the additional strong lines at a step of S05; determining that the pixels of the first strong lines and the pixels of the additional strong lines correspond to the pixels of the lane at a step of S06; calculating a segmentation loss by referring to the detected lane and a ground truth (GT) lane at a step of S07; performing backpropagation by using the segmentation loss to thereby optimize at least one parameter of the CNN at a step of S08; and performing a lane detection process by a testing device for lane detection using the optimized parameters of the CNN at a step of S09. However, it is not necessary to perform all the steps from S01 to S09.

The CNN-based lane detection method in accordance with the present invention relates to a post-processing for a probability map obtained by the segmentation result, which is composed of 2 processes. A first process is a process of detecting lane candidate pixels. In this process, unlike a process of directly detecting lane pixels by referring to the segmentation result according to the conventional art, not only pixels having high probabilities of being one of lanes, but also certain pixels adjacent to some of the pixels having high probabilities of being one of the lanes (although the certain pixels have low probabilities of being one of the lanes), are determined as the lane pixels. Thereafter, in a second process, the determined lane pixels are regarded as 2$d$ points, and Polynomial fitting algorithm or spline fitting algorithm may be applied to their adjacent pixels, to thereby acquire refined lanes. Herein, the lane candidate pixels mean candidate pixels which can become lane pixels as a result of segmentation, and the lane pixels mean pixels selected as pixels having high probabilities of being one of the lanes. All of the pixels having very high probabilities of being one of the lanes are determined as the lane pixels, but some of the pixels not having very high probabilities of being one of the lanes may be determined as the lane pixels after a process of the present invention is performed.

Specifically, referring to FIG. 4, at the step of S01, if the learning device obtains a training image through a communication unit, the learning device supports an encoding layer to apply one or more convolution operations and non-linear operations such as ReLU to the training image to thereby obtain one or more encoded feature maps. Thereafter, the learning device supports a decoding layer to apply additional operations such as deconvolution operations or SoftMax operations to a specific encoded feature map outputted from the encoding layer to thereby obtain a segmentation result including information on at least one lane candidate pixel in the input image. Then the probability map indicating each of probabilities that each of the pixels of the training image is one of the lanes by using the segmentation result.

At the step of S02, each of the probability scores of the lane candidate pixels in the probability map is compared with the predetermined first threshold and the predetermined second threshold. Herein, the first threshold is set to be greater than the second threshold. If the probability score or its processed value of a lane candidate pixel is equal to or greater than the first threshold, the lane candidate pixel is classified as a pixel of the first strong line. The pixel of the first strong line corresponds to "line candidate pixel" of the conventional art, and the predetermined first threshold becomes a criterion value which distinguishes the line candidate pixel from the background in the convention art.

In addition, if a probability score of the lane candidate pixel is a value between the predetermined first threshold and the predetermined second threshold, the lane candidate pixel is classified as a pixel of the weak line. If a probability score of the lane candidate pixel is less than the predetermined second threshold, the lane candidate pixel is classified as a pixel which is not included in any one of the lanes.

Thereafter, (I) if one or more values of distance between (i) one or more specific pixels among the pixels of the weak lines and (ii) at least part of the pixels of the first strong lines are less than the predetermined first distance, the specific pixels are classified as pixels of one or more additional strong lines, and (II) if one or more values of distance between (i) one or more certain pixels among the pixels of the weak lines and (ii) at least part of the pixels of the additional strong lines are less than the predetermined second distance, the certain pixels are classified as pixels of the additional strong lines. Herein, the above-mentioned processes are repeated until there is no certain pixel to be further classified as a pixel of the additional strong lines, then it is determined the pixels of the first strong lines and the pixels of the additional strong lines as the pixels of the lane.

Figure 5:
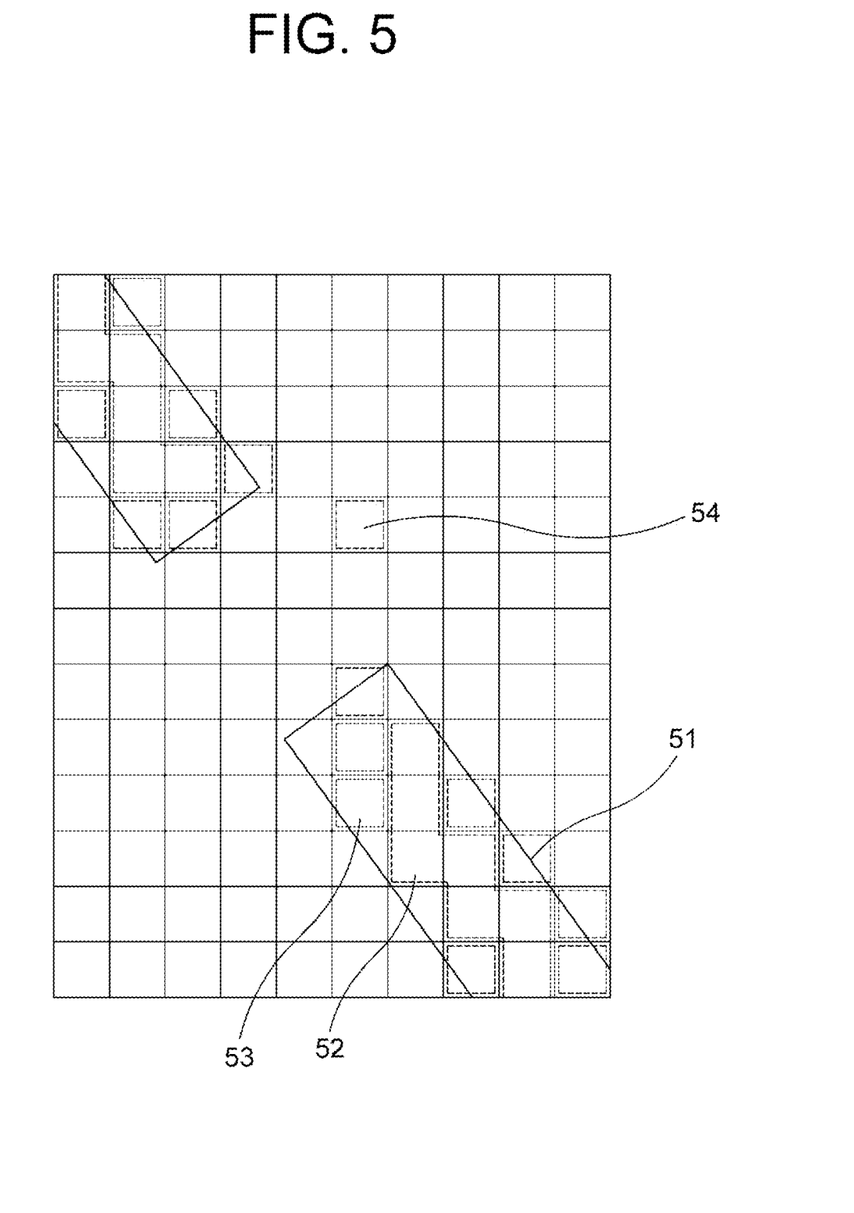
FIG. 5 is a diagram illustrating a process of classifying pixels corresponding to a weak line as pixels corresponding to a strong line in accordance with the present invention.

FIG. 5 is a diagram illustrating a process of classifying pixels of a weak line as pixels of a strong line in accordance with the present invention.

Referring to FIG. 5, at the step of S03, if one or more values of distance between (i) one or more specific pixels among the pixels of the weak lines and (ii) at least part of the pixels of the first strong lines are less than the predetermined first distance, the specific pixels are classified as pixels of one or more additional strong lines. For example, if there are 100 pixels of the first strong line(s) in the input image, it is checked whether there are pixels of a weak line(s) in one or more adjacent areas to at least part of the 100 pixels. If there are pixels of the weak line(s) in the adjacent areas to at least part of the 100 pixels, the pixels of the weak line(s) may be classified as the pixels of the additional strong line(s). Herein, it is not necessary to check whether there are pixels of the weak line(s) in the adjacent areas to all of the 100 pixels.

Herein, the predetermined first distance may represent a shortest distance such as a distance between any two closest pixels or a long distance such as an n-pixel-distance.

In addition, the learning device determines whether each of the pixels of the weak lines is classified as one of the pixels of the additional strong lines by referring to information on a direction of lane corresponding to the pixels of the first strong lines. For example, if the pixels of the first strong lines are grouped in a direction of a specific angle within the input image, (I) it is determined whether there are a first part of the pixels of the weak lines within a first pixel distance from at least part of the pixels of the first strong lines in case the first part of the pixels of the weak lines are within a predetermined angle from the direction, and (II) it is determined whether there are a second part of the pixels of the weak lines within a second pixel distance from at least part of the pixels of the first strong lines in case the first part of the pixels of the weak lines are not within a predetermined angle from the direction. Herein, the second pixel distance is smaller than the first pixel distance.

Further, the process of classifying the specific pixels as pixels of the additional strong lines has been completed at the step of S03, and thus at the step of S04, a process similar to the step of S03 is performed for pixels classified as the pixels of the additional strong lines. Namely, at the step of S04, if one or more values of distance between (i) one or more certain pixels among the pixels of the weak lines and (ii) at least part of the pixels of the additional strong lines are less than the predetermined second distance, the certain pixels are classified as pixels of the additional strong lines. That is, if there are pixels of the weak lines near the pixels of the first strong lines, the pixels of the weak lines may be sequentially classified as the pixels of the additional strong lines through the step of S04.

Herein, the distance between (i) the certain pixels among the pixels of the weak lines and (ii) at least part of the pixels of the additional strong lines may be calculated for all of the pixels of the additional strong lines. For example, if the number of the pixels of the additional strong lines is 50, the distance may be calculated for each of the 50 pixels.

Further, at the step of S05, the step of S04 is repeated until there is no certain pixel to be further classified as a pixel of the additional strong lines. Namely, the step of S04 is repeated until there is no pixel of the weak lines adjacent to the pixels of the additional strong lines. As such, the pixels of the weak lines grouped near the pixels of the first strong lines are classified as the pixels of the additional strong lines, but pixels located far away from the pixels of the first strong lines, or pixels grouped in such a manner that only the pixels of the weak lines are grouped remain as the pixels of the weak lines.

FIG. 5 illustrates an example of detecting pixels 52 of the first strong lines and pixels 53 and 54 of the weak lines near actual lanes 51 within the input image. The pixels 52 of the first strong lines are regarded as pixels of the actual lane from the beginning. Among the pixels 53 and 54 of the weak lines, (i) the pixels 53 of the weak lines adjacent to the pixels 52 of the first strong lines, and (ii) other pixels adjacent to the pixels 53 of the weak lines adjacent to the pixels 52 of the first strong lines (i.e., pixels grouped directly or indirectly near the pixels 52 of the first strong lines) are recognized as the pixels of the additional strong lines. However, as shown in FIG. 5, the pixel 54 of the weak lines located far away from the pixels 53 of the weak lines adjacent to the pixels 52 of the first strong lines are not classified as the pixels of the additional strong lines but remain as the pixel of the weak lines.

At the step of S06, it is determined that the pixels of the first strong lines and the pixels of the additional strong lines correspond to the pixels of the lane, i.e., the pixels of the actual lane. Namely, after the steps S03 to S05, the pixels of the first strong lines and the pixels of the additional strong lines are determined as the pixels of the lane, and then the actual lane corresponding to the pixels of the first strong line and the additional strong line is precisely detected by using Polynomial fitting algorithm or spline fitting algorithm.

Referring to FIG. 5, if it is determined that the pixels of the first strong lines and the pixels of the additional strong lines among the pixels of the weak lines correspond to the pixels of the lane, a result similar to the actual lines 51 may be outputted.

Thereafter, the segmentation loss is calculated by referring to the detected lane and the ground truth (GT) lane at the step of S07, and the backpropagation is performed by using the segmentation loss to thereby optimize at least one parameter of the CNN at the step of S08.

At the step of S09, the lane detection process is performed by the testing device with the optimized parameters of the CNN. Namely, at the step of S09, on condition that the optimized parameters of the learned learning device have been obtained through the previous steps, the lane detection process is performed by using the testing device.

Namely, on condition that (I) the learning device, if a training image is obtained, has supported an encoding layer to apply one or more convolution operations to the training image to thereby obtain one or more encoded feature maps for training, and has supported a decoding layer to apply one or more deconvolution operations to a specific encoded feature map for training outputted from the encoding layer to thereby obtain a segmentation result for training including information on one or more lane candidate pixels for training in the training image; (II) the learning device has compared each of probability scores of each of the lane candidate pixels for training with a predetermined first threshold and compares each of the probability scores with a predetermined second threshold smaller than the first threshold, then if one or more probability scores of one or more first parts of the lane candidate pixels for training are equal to or greater than the first threshold, has classified the first parts of the lane candidate pixels for training as pixels of one or more first strong lines for training, and if one or more probability scores of one or more second parts of the lane candidate pixels for training are less than the first threshold and are equal to or greater than the second threshold, has classified the second parts as pixels of one or more weak lines for training; (III) the learning device, if one or more values of distance between (i) one or more specific pixels among the pixels of the weak lines for training and (ii) at least part of the pixels of the first strong lines for training are less than a predetermined first distance, has classified the specific pixels as pixels of one or more additional strong lines for training, and has determined that the pixels of the first strong lines for training and the specific pixels of the additional strong lines for training correspond to pixels of the lane; (IV) the learning device has calculated a segmentation loss by referring to the detected lane and a ground truth (GT) lane; and (V) the learning device has performed backpropagation by using the segmentation loss to thereby optimize at least one parameter of the learning device, the testing device obtains a test image.

The testing device supports the encoding layer to apply one or more convolution operations to the test image to thereby obtain one or more encoded feature maps for testing, and supports the decoding layer to apply one or more deconvolution operations to a specific encoded feature map for testing outputted from the encoding layer to thereby obtain a segmentation result for testing including information on one or more lane candidate pixels for testing in the test image.

Then, the testing device compares each of probability scores of each of the lane candidate pixels for testing with a predetermined first threshold and compares each of the probability scores with a predetermined second threshold smaller than the first threshold, then if one or more probability scores of one or more first parts of the lane candidate pixels for testing are equal to or greater than the first threshold, classifies the first parts of the lane candidate pixels for testing as pixels of one or more first strong lines for testing, and if one or more probability scores of one or more second parts of the lane candidate pixels for testing are less than the first threshold and are equal to or greater than the second threshold, classifies the second parts as pixels of one or more weak lines for testing.

Thereafter, the testing device, if one or more values of distance between (i) one or more specific pixels among the pixels of the weak lines for testing and (ii) at least part of the pixels of the first strong lines for testing are less than the predetermined first distance, classifies the specific pixels as pixels of one or more additional strong lines for testing, and determines that the pixels of the first strong lines for testing and the pixels of the additional strong lines for testing correspond to pixels of the lane.

Herein, the testing device can accurately detect the lane corresponding to the pixels of the first strong lines and the additional strong lines by using the Polynomial fitting algorithm or the spline fitting algorithm.

The steps of S01 to S09 may be performed in the processor of the learning device, and the steps of S01 to S06 may be performed in the processor of the testing device.

The present invention has an effect of accurately detecting lanes by utilizing lane candidate pixels determined as having low probabilities of being one of the lanes as well as lane candidate pixels determined as having high probabilities of being one of the lanes in a probability map acquired as a result of segmentation.

The present invention has another effect of easily detecting disconnected lanes, thin lanes and lanes at a distant side in an image because some lane candidate pixels, determined as having low probabilities of being one of the lanes although they are part of the actual lanes, are also appropriately detected as one of the lanes.

It would be understood by one of ordinary skill in the art that transmission/reception of the above-described images, i.e., image data such as a training image and a test image, can be performed by communication units of the learning device and the testing device, data for performing operation with a feature map can be held/maintained by the processor and/or memory) of the learning device and the testing device, and the processes of the convolutional operation, the deconvolutional operation and the loss value operation can be mainly performed by the processor of the learning device and the testing device, but the present invention is not limited to these examples.

The objects of the technical solution of the present invention or parts contributing to the prior art can be implemented in a form of executable program command through a variety of computer means and can be recorded to computer readable recording media. The computer readable media may include solely or in combination, program commands, data files, and data structures. The program commands recorded to the media may be components specially designed for the present invention or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a compiler but also a high-level code that can be used by an interpreter etc., which is executed by a computer. The aforementioned hardware devices can work as more than a software module to perform the action of the present invention and they can do the same in the opposite case. The hardware devices may be combined with memory such as ROM and RAM to store program commands and include a processor such as CPU or GPU composed to execute commands stored in the memory and also include a communication part for sending and receiving signals with external devices.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variants equal or equivalent to the patent claims pertain to the category of the thought of the present invention.

What is claimed is:

1. A learning method for detecting at least one lane based on a convolutional neural network (CNN), comprising steps of:
   (a) a learning device, if an input image is obtained, supporting an encoding layer to apply one or more convolution operations to the input image to thereby obtain one or more encoded feature maps, and supporting a decoding layer to apply one or more deconvolution operations to a specific encoded feature map outputted from the encoding layer to thereby obtain a segmentation result including information on one or more lane candidate pixels in the input image;
   (b) the learning device comparing each of probability scores of each of the lane candidate pixels with a predetermined first threshold and comparing each of the probability scores with a predetermined second threshold smaller than the first threshold, then if one or more probability scores of one or more first parts of the lane candidate pixels are equal to or greater than the first threshold, classifying the first parts of the lane candidate pixels as pixels of one or more first strong lines, and if one or more probability scores of one or more second parts of the lane candidate pixels are less than the first threshold and are equal to or greater than the second threshold, classifying the second parts as pixels of one or more weak lines; and
   (c) the learning device, if one or more values of distance between (i) one or more specific pixels among the pixels of the weak lines and (ii) at least part of the pixels of the first strong lines are less than a predetermined first distance, classifying the specific pixels as pixels of one or more additional strong lines, and determining that the pixels of the first strong lines and the pixels of the additional strong lines correspond to pixels of the lane.

2. The learning method of claim 1, wherein, after the step of (c), the learning device, if one or more values of distance between (i) one or more certain pixels among the pixels of the weak lines and (ii) at least part of the pixels of the additional strong lines are less than a predetermined second distance, performs a process of classifying the certain pixels as pixels of the additional strong lines, and repeats the process until there is no certain pixel to be further classified as a pixel of the additional strong lines, then determines that the pixels of the first strong lines and the pixels of the additional strong lines correspond to the pixels of the lane.

3. The learning method of claim 2, wherein, at the step of (c),
   (c1) if the values of distance between (i) the specific pixels among the pixels of the weak lines and (ii) at least part of the pixels of the first strong lines are less than the predetermined first distance, the learning device classifies the specific pixels as the pixels of the additional strong lines;
   (c2) if the values of distance between (i) the certain pixels among the pixels of the weak lines and (ii) at least part of the pixels of the additional strong lines are less than the predetermined second distance, the learning device classifies the certain pixels as the pixels of the additional strong lines; and
   (c3) the learning device repeats the step of (c2) until there is no certain pixel to be further classified as a pixel of the additional strong lines, then determines the pixels of the first strong lines and those of the additional strong lines as the pixels of the lane.

4. The learning method of claim 2, wherein, at the step of (c), the learning device determines whether each of the pixels of the weak lines is classified as one of the pixels of the additional strong lines by referring to information on a direction of lane corresponding to the pixels of the first strong lines, wherein, if the pixels of the first strong lines are grouped in a direction of a specific angle within the input image, (I) the learning device determines whether there are a first part of the pixels of the weak lines within a first pixel distance from at least part of the pixels of the first strong lines in case the first part of the pixels of the weak lines are within a predetermined angle from the direction, and (II) the learning device determines whether there are a second part of the pixels of the weak lines within a second pixel distance from at least part of the pixels of the first strong lines in case the second part of the pixels of the weak lines are not within the predetermined angle from the direction, and wherein the second pixel distance is smaller than the first pixel distance.

5. The learning method of claim 1, wherein, at the step of (c), the learning device detects the lane corresponding to the pixels of the first strong line and the additional strong line by using Polynomial fitting algorithm or spline fitting algorithm.

6. The learning method of claim 1, wherein the predetermined first distance represents a distance between two closest pixels.

7. The learning method of claim 1, wherein the predetermined first distance represents a distance between a certain pixel and an n-th pixel from the certain pixel.

8. The learning method of claim 1, further comprising steps of:
(d) the learning device calculating a segmentation loss by referring to the detected lane and a ground truth (GT) lane; and
(e) the learning device performing backpropagation by using the segmentation loss to thereby optimize at least one parameter of the CNN.

9. A testing method for detecting at least one lane included in a convolutional neural network (CNN)-based image, comprising steps of:
(a) on condition that (I) a learning device has supported an encoding layer to apply one or more convolution operations to a training image to thereby obtain one or more encoded feature maps for training, and has supported a decoding layer to apply one or more deconvolution operations to a specific encoded feature map for training outputted from the encoding layer to thereby obtain a segmentation result for training including information on one or more lane candidate pixels for training in the training image; (II) the learning device has compared each of probability scores of each of the lane candidate pixels for training with a predetermined first threshold and compares each of the probability scores with a predetermined second threshold smaller than the first threshold, then if one or more probability scores of one or more first parts of the lane candidate pixels for training are equal to or greater than the first threshold, has classified the first parts of the lane candidate pixels for training as pixels of one or more first strong lines for training, and if one or more probability scores of one or more second parts of the lane candidate pixels for training are less than the first threshold and are equal to or greater than the second threshold, has classified the second parts as pixels of one or more weak lines for training; (III) the learning device, if one or more values of distance between (i) one or more specific pixels among the pixels of the weak lines for training and (ii) at least part of the pixels of the first strong lines for training are less than a predetermined first distance, has classified the specific pixels as pixels of one or more additional strong lines for training, and has determined that the pixels of the first strong lines for training and the specific pixels of the additional strong lines for training correspond to pixels of the lane; (IV) the learning device has calculated a segmentation loss by referring to the detected lane and a ground truth (GT) lane; and (V) the learning device has performed backpropagation by using the segmentation loss to thereby optimize at least one parameter of the learning device, a testing device obtaining a test image;
(b) the testing device supporting the encoding layer to apply one or more convolution operations to the test image to thereby obtain one or more encoded feature maps for testing, and supporting the decoding layer to apply one or more deconvolution operations to a specific encoded feature map for testing outputted from the encoding layer to thereby obtain a segmentation result for testing including information on one or more lane candidate pixels for testing in the test image;
(c) the testing device comparing each of probability scores of each of the lane candidate pixels for testing with a predetermined first threshold and comparing each of the probability scores with a predetermined second threshold smaller than the first threshold, then if one or more probability scores of one or more first parts of the lane candidate pixels for testing are equal to or greater than the first threshold, classifying the first parts of the lane candidate pixels for testing as pixels of one or more first strong lines for testing, and if one or more probability scores of one or more second parts of the lane candidate pixels for testing are less than the first threshold and are equal to or greater than the second threshold, classifying the second parts as pixels of one or more weak lines for testing; and
(d) the testing device, if one or more values of distance between (i) one or more specific pixels among the pixels of the weak lines for testing and (ii) at least part of the pixels of the first strong lines for testing are less than the predetermined first distance, classifying the specific pixels as pixels of one or more additional strong lines for testing, and determining that the pixels of the first strong lines for testing and the pixels of the additional strong lines for testing correspond to pixels of the lane.

10. A learning device for detecting at least one lane based on a convolutional neural network (CNN), comprising:
a communication part for obtaining an input image; and
a processor for performing processes of (I), if the input image is obtained, supporting an encoding layer to apply one or more convolution operations to the input image to thereby obtain one or more encoded feature maps, and supporting a decoding layer to apply one or more deconvolution operations to a specific encoded feature map outputted from the encoding layer to thereby obtain a segmentation result including information on one or more lane candidate pixels in the input image, (II) comparing each of probability scores of each of the lane candidate pixels with a predetermined first threshold and comparing each of the probability scores with a predetermined second threshold smaller than the first threshold, then if one or more probability scores of one or more first parts of the lane candidate pixels are equal to or greater than the first threshold, classifying the first parts of the lane candidate pixels as pixels of one or more first strong lines, and if one or more probability scores of one or more second parts of the lane candidate pixels are less than the first threshold and are equal to or greater than the second threshold, classifying the second parts as pixels of one or more weak lines, and (III) if one or more values of distance between (i) one or more specific pixels among the pixels of the weak lines and (ii) at least part of the pixels of the first strong lines are less than a predetermined first distance, classifying the specific pixels as pixels of one or more additional strong lines, and determining that the pixels of the first strong lines and the pixels of the additional strong lines correspond to pixels of the lane.

11. The learning device of claim 10, wherein, after the process of (III), the processor, if one or more values of distance between (i) one or more certain pixels among the pixels of the weak lines and (ii) at least part of the pixels of the additional strong lines are less than a predetermined second distance, performs a process of classifying the certain pixels as pixels of the additional strong lines, and repeats the process until there is no certain pixel to be further classified as a pixel of the additional strong lines, then determines that the pixels of the first strong lines and the pixels of the additional strong lines correspond to the pixels of the lane.

12. The learning device of claim 11, wherein, at the process of (III),
(III_1) if the values of distance between (i) the specific pixels among the pixels of the weak lines and (ii) at least part of the pixels of the first strong lines are less than the predetermined first distance, the processor classifies the specific pixels as the pixels of the additional strong lines;
(III_2) if the values of distance between (i) the certain pixels among the pixels of the weak lines and (ii) at least part of the pixels of the additional strong lines are less than the predetermined second distance, the processor classifies the certain pixels as the pixels of the additional strong lines; and
(III_3) the processor repeats the process of (III_2) until there is no certain pixel to be further classified as a pixel of the additional strong lines, then determines the pixels of the first strong lines and those of the additional strong lines as the pixels of the lane.

13. The learning device of claim 11, wherein, at the process of (III), the processor determines whether each of the pixels of the weak lines is classified as one of the pixels of the additional strong lines by referring to information on a direction of lane corresponding to the pixels of the first strong lines,
wherein, if the pixels of the first strong lines are grouped in a direction of a specific angle within the input image, (1) the processor determines whether there are a first part of the pixels of the weak lines within a first pixel distance from at least part of the pixels of the first strong lines in case the first part of the pixels of the weak lines are within a predetermined angle from the direction, and (2) the processor determines whether there are a second part of the pixels of the weak lines within a second pixel distance from at least part of the pixels of the first strong lines in case the second part of the pixels of the weak lines are not within the predetermined angle from the direction, and
wherein the second pixel distance is smaller than the first pixel distance.

14. The learning device of claim 10, wherein, at the process of (III), the processor detects the lane corresponding to the pixels of the first strong line and the additional strong line by using Polynomial fitting algorithm or spline fitting algorithm.

15. The learning device of claim 10, wherein the predetermined first distance represents a distance between two closest pixels.

16. The learning device of claim 10, wherein the predetermined first distance represents a distance between a certain pixel and an n-th pixel from the certain pixel.

17. The learning device of claim 10, wherein the processor further performs processes of:
(IV) calculating a segmentation loss by referring to the detected lane and a ground truth (GT) lane; and
(V) performing backpropagation by using the segmentation loss to thereby optimize at least one parameter of the CNN.

18. A testing device for detecting at least one lane included in a convolutional neural network (CNN)-based image, comprising:
a communication part for, on condition that (I) a learning device has supported an encoding layer to apply one or more convolution operations to a training image to thereby obtain one or more encoded feature maps for training, and has supported a decoding layer to apply one or more deconvolution operations to a specific encoded feature map for training outputted from the encoding layer to thereby obtain a segmentation result for training including information on one or more lane candidate pixels for training in the training image; (II) the learning device has compared each of probability scores of each of the lane candidate pixels for training with a predetermined first threshold and compares each of the probability scores with a predetermined second threshold smaller than the first threshold, then if one or more probability scores of one or more first parts of the lane candidate pixels for training are equal to or greater than the first threshold, has classified the first parts of the lane candidate pixels for training as pixels of one or more first strong lines for training, and if one or more probability scores of one or more second parts of the lane candidate pixels for training are less than the first threshold and are equal to or greater than the second threshold, has classified the second parts as pixels of one or more weak lines for training; (III) the learning device, if one or more values of distance between (i) one or more specific pixels among the pixels of the weak lines for training and (ii) at least part of the pixels of the first strong lines for training are less than a predetermined first distance, has classified the specific pixels as pixels of one or more additional strong lines for training, and has determined that the pixels of the first strong lines for training and the specific pixels of the additional strong lines for training correspond to pixels of the lane; (IV) the learning device has calculated a segmentation loss by referring to the detected lane and a ground truth (GT) lane; and (V) the learning device has performed backpropagation by using the segmentation loss to thereby optimize at least one parameter of the learning device, obtaining a test image; and
a processor for (1) supporting the encoding layer to apply one or more convolution operations to the test image to thereby obtain one or more encoded feature maps for testing, and supporting the decoding layer to apply one or more deconvolution operations to a specific encoded feature map for testing outputted from the encoding layer to thereby obtain a segmentation result for testing including information on one or more lane candidate pixels for testing in the test image, (2) comparing each of probability scores of each of the lane candidate pixels for testing with a predetermined first threshold and comparing each of the probability scores with a predetermined second threshold smaller than the first threshold, then if one or more probability scores of one or more first parts of the lane candidate pixels for testing are equal to or greater than the first threshold, classifying the first parts of the lane candidate pixels for testing as pixels of one or more first strong lines for testing, and if one or more probability scores of one or more second parts of the lane candidate pixels for testing are less than the first threshold and are equal to or greater than the second threshold, classifying the second parts as pixels of one or more weak lines for testing, and (3), if one or more values of distance between (i) one or more specific pixels among the pixels of the weak lines for testing and (ii) at least part of the pixels of the first strong lines for testing are less than the predetermined first distance, classifying the specific pixels as pixels of one or more additional strong lines for testing, and determining that the pixels of the first strong lines for testing and the pixels of the additional strong lines for testing correspond to pixels of the lane.

* * * * *